(12) United States Patent
Schumacher et al.

(10) Patent No.: US 7,537,833 B2
(45) Date of Patent: May 26, 2009

(54) PYROGENICALLY PRODUCED SILICON DIOXIDE POWDER AND DISPERSION THEREOF

(75) Inventors: Kai Schumacher, Hofheim (DE);
Hauke Jacobsen, Mobile, AL (US);
Ralph Brandes, Princeton, NJ (US);
Matthias Rochnia, Ortenberg (DE);
Takeyoshi Shibasaki, Nerima-ku (JP);
Naruyasu Ishibashi, Yokkaichi (JP)

(73) Assignee: Degussa AG, Duesseldorf (DE)

( * ) Notice: Subject to any disclaimer, the term of this patent is extended or adjusted under 35 U.S.C. 154(b) by 525 days.

(21) Appl. No.: 11/055,605

(22) Filed: Feb. 11, 2005

(65) Prior Publication Data

US 2006/0154994 A1 Jul. 13, 2006

(30) Foreign Application Priority Data

Jan. 12, 2005 (DE) .................. 10 2005 001 410

(51) Int. Cl.
*B32B 5/16* (2006.01)
(52) U.S. Cl. ............... 428/402; 428/404; 428/403; 428/407; 438/692; 51/308; 427/212
(58) Field of Classification Search .......... 428/402, 428/404, 407, 403; 438/692; 51/308; 427/212
See application file for complete search history.

(56) References Cited

U.S. PATENT DOCUMENTS

| 6,063,354 | A | 5/2000 | Mangold et al. |
| 6,767,377 | B2 * | 7/2004 | Schumacher et al. ......... 51/308 |
| 6,773,814 | B2 * | 8/2004 | Hasenzahl et al. ......... 428/404 |
| 6,855,635 | B2 * | 2/2005 | Schumacher et al. ....... 438/692 |
| 2004/0253164 | A1 | 12/2004 | Mangold et al. |

FOREIGN PATENT DOCUMENTS

| DE | 102 58 857 | 7/2004 |
| DE | 102 58 858 | 8/2004 |
| EP | 1 486 461 | 12/2004 |
| WO | WO 2004/054929 A1 | 7/2004 |
| WO | WO 2005/054928 A1 | 6/2005 |
| WO | WO 2005/095501 A1 | 10/2005 |

OTHER PUBLICATIONS

U.S. Appl. No. 11/055,605, filed Feb. 11, 2005, Schumacher, et al.
U.S. Appl. No. 10/524,037, filed Feb. 9, 2005, Schumacher, et al.
U.S. Appl. No. 10/530,284, filed Apr. 5, 2005, Moerters, et al.
U.S. Appl. No. 10/530,491, filed Apr. 6, 2005, Moerters, et al.
U.S. Appl. No. 10/863,348, filed Jun. 9, 2004, Mangold, et al.
U.S. Appl. No. 11/084,022, filed Mar. 21, 2005, Schumacher, et al.
U.S. Appl. No. 11/084,170, filed Mar. 21, 2005, Schumacher, et al.
U.S. Appl. No. 11/085,151, filed Mar. 22, 2005, Schumacher, et al.
U.S. Appl. No. 11/055,605, filed Feb. 11, 2005, Schumacher, et al.
U.S. Appl. No. 10/549,929, filed Sep. 20, 2005, Schumacher, et al.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

Pyrogenically produced silicon dioxide powder in the form of aggregates of primary particles having a BET surface area of $90\pm15$ m$^2$/g, wherein the aggregates display an average surface area of 10000 to 20000 nm$^2$, an average equivalent circle diameter (ECD) of 90 to 130 nm and an average circumference of 1000 to 1400 nm.

It is produced by a pyrogenic process in which silicon tetrachloride and a second silicon component comprising $H_3SiCl$, $H_2SiCl_2$, $HSiCl_3$, $CH_3SiCl_3$, $(CH_3)_2SiCl_2$, $(CH_3)_3SiCl$ and/or (n-$C_3H_7$)SiCl$_3$ are mixed with primary air and a combustion gas and burnt into a reaction chamber, secondary air also being introduced into the reaction chamber, and the feed materials being chosen such that an adiabatic flame temperature of 1810 to 1890° C. is obtained.

Dispersion containing the pyrogenically produced silicon dioxide powder.

17 Claims, No Drawings

PYROGENICALLY PRODUCED SILICON DIOXIDE POWDER AND DISPERSION THEREOF

The invention concerns a pyrogenically produced silicon dioxide powder, its production and use. The invention also concerns a dispersion containing the pyrogenically produced silicon dioxide powder.

Flame hydrolysis for the production of silicon dioxide is a process that has long been known and is performed on an industrial scale. In this process an evaporated or gaseous hydrolysable silicon halide is mixed with a flame formed by burning a water-forming, hydrogen-containing fuel and an oxygen-containing gas. The combustion flame provides water for hydrolysis of the silicon halide and sufficient heat for the hydrolysis reaction. The silicon dioxide powder carried in the residual reaction gases is subjected to conventional cooling and solids separation processes. Silicon tetrachloride is usually used. The use of dichlorosilane, trichlorosilane is also known, however. If carbon-containing feed materials are used, such as e.g. methyl trichlorosilane, dimethyl dichlorosilane, methyl dichlorosilane, dibutyl dichlorosilane, ethyl trichlorosilane, propyl trichlorosilane, an oxidation process to convert the carbon into carbon dioxide also takes place.

As a consequence, a silicon dioxide powder which is formed in a process wherein both reaction types, namely flame hydrolysis and oxidation, take place is described as a pyrogenically produced silicon dioxide.

In the reaction, highly dispersed, non-porous primary particles are initially formed, which as the reaction continues coalesce to form aggregates which in turn can congregate to form agglomerates. The BET surface area of these primary particles is generally between 5 and 600 m$^2$/g. The powder displays free hydroxyl groups on its surface.

The silicon dioxide powder produced in this way is used in many applications. Of particular importance is its use as an abrasive in aqueous dispersions for the chemical-mechanical polishing of surfaces. A substantial cost factor here is the time needed for incorporation into the liquid medium. It has been found that for silicon dioxide powders produced by the prior art, even though they were produced by the same type of reaction and also display parameters that are identical or similar to the parameters that are conventionally cited for characterisation, such as the BET surface area for example, very long times are needed for incorporation into liquid media.

The object of the invention is therefore to provide a silicon dioxide powder that can be incorporated quickly into liquid media.

A further object of the invention is to provide a process for the production of this powder.

A further object of the invention is to provide a dispersion of this powder. It should in particular lead to a minimising of scratches on the surface to be polished in chemical-mechanical polishing.

The invention provides a pyrogenically produced silicon dioxide powder in the form of aggregates of primary particles, which has a BET surface area of 90±15 m$^2$/g, and in which the aggregates display an average surface area of 10000 to 20000 nm$^2$, an average equivalent circle diameter (ECD) of 90 to 130 nm and an average circumference of 1000 to 1400 nm.

The BET surface area is determined here in accordance with DIN 66131.

The aggregate sizes are determined by image analysis using an H 7500 TEM device supplied by Hitachi and a MegaView II CCD camera supplied by SIS. The image magnification for analysis is 30000:1 with a pixel density of 3.2 nm. The number of particles analysed is greater than 1000. Preparation takes place in accordance with ASTM 3849-89. The lower threshold limit in terms of detection is 50 pixels.

The BET surface area can preferably be 90±10 m$^2$/g and particularly preferably 90±5 m$^2$/g.

Furthermore, a pyrogenically produced silicon dioxide powder according to the invention can be preferred in which the aggregates display an average surface area of 12000 to 18000 nm$^2$, an average equivalent circle diameter of 100 to 125 nm and an average circumference of 1100 to 1300 nm.

Furthermore, a pyrogenically produced silicon dioxide powder according to the invention can be preferred in which the maximum aggregate diameter is between 200 and 250 nm and the minimum aggregate diameter is between 100 and 155 nm.

Furthermore, a pyrogenically produced silicon dioxide powder according to the invention can be preferred in which the chloride content is less than 250 ppm. A chloride content of less than 50 ppm is particularly preferred.

Furthermore, a pyrogenically produced silicon dioxide powder according to the invention can be preferred in which the carbon content is less than 100 ppm. A carbon content of less than 25 ppm is particularly preferred.

The invention also provides a process for the production of the silicon dioxide powder according to the invention wherein a mixture of silicon compounds is evaporated, separately or together, the vapours are transferred by means of a carrier gas to a mixing chamber, with SiCl$_4$ as the first component in a proportion of 60 to 95 wt. % relative to the mixture, and a second component chosen from the group comprising H$_3$SiCl, H$_2$SiCl$_2$, HSiCl$_3$, CH$_3$SiCl$_3$, (CH$_3$)$_2$SiCl$_2$, (CH$_3$)$_3$SiCl, (n-C$_3$H$_7$)SiCl$_3$, in a proportion of 5 to 40 wt. %, relative to the mixture, and a combustion gas and primary air, which can optionally be enriched with oxygen and/or be preheated, are transferred separately to the mixing chamber, the mixture comprising the vapour of silicon chlorides, combustion gas and primary air is ignited in a burner and the flame burns into a reaction chamber, secondary air, which surrounds the flame, is introduced into the reaction chamber, the ratio of secondary air to primary air being in a range from 0.1 to 3, preferably 0.25 to 2, the solid is then separated from gaseous substances and the solid is then steam-treated, wherein the total amount of oxygen is at least sufficient for the complete combustion of the combustion gas and the silicon compounds and the amount of feed materials consisting of silicon compounds, combustion gas, primary air and secondary air is chosen such that an adiabatic flame temperature $T_{ad}$ of 1800 to 1880° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

The specific heat capacities can be determined with the aid of the VDI-Wärmeatlas, for example (section 7.1 to 7.3 and 3.7, 8$^{th}$ edition).

The reaction of the silicon compounds in the presence of oxygen and a combustion gas yields silicon dioxide, water, hydrochloric acid and, in the case of carbon-containing silicon compounds and/or carbon-containing combustion gases, carbon dioxide. The reaction enthalpies of these reactions can be calculated by means of standard works known to the person skilled in the art.

Table 1 shows selected reaction enthalpy values for the reaction of silicon compounds in the presence of hydrogen and oxygen.

TABLE 1

Reaction enthalpies

| | KJ/mol |
|---|---|
| $H_2$ | −241.8 |
| $SiCl_4$ | −620.1 |
| $SiHCl_3$ | −659.4 |
| $SiH_2Cl_2$ | −712.3 |
| $C_3H_7SiCl_3$ | −2700.2 |
| $CH_3SiCl_3$ | −928.3 |
| $(CH_3)_3SiCl$ | −2733.8 |

Methyl trichlorosilane (MTCS, $CH_3SiCl_3$), trichlorosilane (TCS, $SiHCl_3$) and/or dichlorosilane (DCS, $SiH_2Cl_2$) can particularly preferably be used.

Suitable combustion gases are hydrogen, methane, ethane, propane and/or natural gas, with hydrogen being preferred.

There is no restriction on the temperature of the feed materials, provided that it is above the boiling point of the highest boiling silicon compound. A temperature of the feed materials of 90° C.±40° C. has proved to be advantageous.

It can also be advantageous if the discharge velocity of the reaction mixture from the mixing chamber into the reaction space is 10 to 80 m/s.

The invention also provides the use of the pyrogenically produced silicon dioxide powder according to the invention as a filler in rubber, silicone rubber and plastics, to adjust the rheology in paints and coatings and as a support for catalysts.

The invention also provides a dispersion containing the pyrogenically produced silicon dioxide powder according to the invention. The liquid phase can consist of water, organic solvents or homogeneous mixtures of water and organic solvents, aqueous dispersions being preferred in chemical-mechanical polishing, for example.

The dispersion according to the invention can preferably display a content of silicon dioxide of between 5 and 60 wt. %.

The pH of the dispersion according to the invention can preferably be in a range between 3 and 12. Ranges between 3 and 5 and between 8 and 11 can be particularly preferred.

The dispersion according to the invention can be stabilised by the addition of bases or acids.

Ammonia, ammonium hydroxide, tetramethyl ammonium hydroxide, primary, secondary or tertiary organic amines, sodium hydroxide solution or potassium hydroxide solution can be used as bases.

Inorganic acids, organic acids or mixtures of the aforementioned can be used as acids.

In particular, phosphoric acid, phosphorous acid, nitric acid, sulfuric acid, mixtures thereof and their acid-reacting salts can be used as inorganic acids.

Carboxylic acids having the general formula $C_nH_{2n+1}CO_2H$, where n=0–6 or n=8, 10, 12, 14, 16, or dicarboxylic acids having the general formula $HO_2C(CH_2)_nCO_2H$, where n=0–4, or hydroxycarboxylic acids having the general formula $R_1R_2C(OH)CO_2H$, where $R_1$=H, $R_2$=$CH_3$, $CH_2CO_2H$, $CH(OH)CO_2H$, or phthalic acid or salicylic acid, or acid-reacting salts of the aforementioned acids or mixtures of the aforementioned acids and salts thereof are preferably used as organic acids.

Stabilisation of the dispersion according to the invention with tetramethyl ammonium hydroxide can be particularly advantageous.

The dispersion can optionally also contain other additives. These can for example be oxidising agents such as hydrogen peroxide or per-acids, oxidation activators whose purpose is to increase the rate of oxidation, corrosion inhibitors such as e.g. benzotriazole. Surface-active substances of a non-ionic, cationic, anionic or amphoteric nature can also be added to the dispersion according to the invention.

It can also be advantageous if the dispersion according to the invention displays an average aggregate diameter in dispersion of less than 200 nm. An average aggregate diameter of less than 100 nm can be particularly advantageous.

The methods known to the person skilled in the art are suitable for producing the dispersion according to the invention, such as high-speed-mixers, ball mills, rotor-stator machines, planetary compounders or high-energy mills, for example. High-energy mills can advantageously be used whenever dispersions having particularly small aggregate diameters are to be produced.

EXAMPLES

The BET surface area is determined in accordance with DIN 66131.

Determining the wet-in time: 50 g of water are added to 15 g of silicon dioxide powder and stirred at 23° C. in a high-speed mixer at 500 rpm. The time taken for the powder to be wetted is measured. This is determined visually.

The viscosity of the dispersions is determined with a Physica model 300 rotary rheometer and a CC 27 measuring beaker at 25° C. The viscosity value is determined at a shear rate of 10 1/sec. This shear rate is in a range in which the viscosity of the dispersions formed is virtually independent of the shear stress.

The particle size prevailing in the dispersion is determined by means of dynamic light scattering. A Zetasizer 3000 HSa (Malvern Instruments, UK) is used. The volume-weighted median value of the peak analysis is stated.

Example 1

Production of a Silicon Dioxide Powder 95 kg/h of silicon tetrachloride and 5 kg/h of trichlorosilane (TCS) are evaporated and transferred to the mixing chamber of a burner by means of nitrogen. At the same time, 34 Nm$^3$/h (1.5 kmol/h) of hydrogen and 70 Nm$^3$/h (3.1 kmol/h) of primary air are introduced into the mixing chamber. The mixture displays a temperature of 90° C. It is ignited and burnt into a reaction chamber in a flame. In addition, 24 Nm$^3$/h (1.1 kmol/h) of secondary air, which surrounds the flame, are introduced into the reaction chamber.

The reaction gases and the silicon dioxide that is formed are drawn through a cooling system by application of a partial vacuum, cooling them to values between 100 and 160° C. The solid is separated from the waste gas stream in a filter or cyclone and then steam-treated at a temperature of 555° C.

Examples 2 to 11 are performed in the same way.

Table 2 reproduces the feed materials and the amounts from Examples 1 to 11.

Table 3 shows the calculated values for reaction enthalpy, heat capacity and adiabatic flame temperature.

Table 4 shows analytical data for the silicon dioxide powders produced, and for two commercially available pyrogenically produced silicon dioxide powders (Examples 12 and 13).

Examples 1 to 5 produce powders according to the invention.

Examples 5 to 10 are comparative examples.

In Example 2 three silicon components are used.

In Examples 3 and 4, high and low proportions of the first silicon component, silicon tetrachloride, are used respectively.

In Example 5 a high ratio of secondary air to primary air within the claimed range is established.

In Examples 6 and 7 settings are chosen which lead to an adiabatic flame temperature outside the claimed range.

In Example 8 only one silicon compound ($SiCl_4$) is used.

In Example 9 the ratio of silicon tetrachloride to the other silicon compounds is outside the claimed range.

In Example 10 no secondary air is introduced.

In Example 11 the ratio of secondary air to primary air is outside the claimed range.

The examples show that the silicon dioxide powder according to the invention from Examples 1 to 5 displays markedly shorter wet-in times than the samples from the comparative examples.

The examples also show that the average aggregate surface area, the average ECD, the average aggregate circumference, the average maximum aggregate diameter and the average minimum aggregate diameter of the silicon dioxide powders according to the invention are smaller than the corresponding values for the comparative examples.

Examples 1 to 5 also show how a specific narrow adiabatic flame temperature range, in this case 1821 to 1851° C., can be obtained by varying the amounts of feed materials.

Comparative examples 6 and 7 also show that with the same composition of silicon compounds as in Example 1, silicon dioxide powders according to the invention are not obtained. The powders obtained display BET surface areas outside the claimed range. In comparative examples 6 and 7, the adiabatic flame temperatures are outside the claimed range.

In comparative examples 8 to 10, the adiabatic flame temperatures are within the claimed range, but silicon dioxide powders according to the invention are not obtained.

In Examples 8 and 9 the composition of the silicon compounds is outside the claimed range. In Example 10 no secondary air is added. As Table 4 shows, powders are obtained whose average aggregate surface areas, average ECD, average aggregate circumferences, average maximum aggregate diameters and average minimum aggregate diameters are larger than those of the silicon dioxide powders according to the invention.

In Example 11 the ratio of secondary air to primary air of 4.11 is outside the claimed range. The silicon dioxide powder obtained displays a BET surface area that is well outside the claimed range.

Example 14

Dispersion, Acid pH Range 36 kg of demineralised water are placed in a 60 l stainless steel batch container. 6.4 kg of the silicon dioxide powder from Example 1 are then drawn in under shear conditions using the suction pipe of the Ystral Conti-TDS 3, and on completion of the drawing-in process shearing is continued for a further 15 min at 3000 rpm.

Example 15

Dispersion, Alkaline pH Range 35.5 kg of demineralised water and 52 g of a 30% KOH solution are placed in a 60 l stainless steel batch container. 6.4 kg of the silicon dioxide powder from Example 1 are then drawn in under shear conditions using the suction pipe of the Ystral Conti-TDS 3, and on completion of the drawing-in process shearing is continued for a further 15 min at 3000 rpm. During this 15-minute dispersion the pH is adjusted to and held at a pH of 10.4 by addition of further KOH solution. A further 43 g of KOH solution were used in this process and a solids concentration of 15 wt. % was established by addition of 0.4 kg water.

Example 16

Dispersion with High Solids Content 35.5 kg of demineralised water in a 60 l stainless steel batch container are adjusted to a pH of 11 with tetramethyl ammonium hydroxide solution (25%). 37 kg of the silicon dioxide powder from Example 1 are then drawn in under shear conditions using the suction pipe of the Ystral Conti-TDS 3, and on completion of the drawing-in process shearing is continued for a further 15 min at 3000 rpm. During this 15-minute dispersion the pH is held at a pH of between 10 and 11 by addition of tetramethyl ammonium hydroxide solution. A solids concentration of 50 wt. % is established by addition of the remaining amount of water that is needed. The dispersion displays no thickening or sedimentation even after a storage period of 6 months.

TABLE 2

| | | Feed materials and amounts used | | | | | | | | | | |
|---|---|---|---|---|---|---|---|---|---|---|---|---|
| | | According to the invention | | | | | | Comparison | | | | |
| | | Example | | | | | | | | | | |
| | | 1 | 2 | 3 | 4 | 5 | 6 | 7 | 8 | 9 | 10 | 11 |
| Hydrogen | Nm³/h | 33 | 40 | 38 | 35 | 10 | 44 | 36 | 37 | 35 | 33 | 38 |
| Primary air | Nm³/h | 70 | 95 | 95 | 100 | 40 | 95 | 95 | 86 | 175 | 96 | 95 |
| Silicon tetrachloride | kg/h | 95 | 85 | 76 | 52 | 55 | 85 | 85 | 80 | 24 | 95 | 76 |
| 2nd silicon component[$] | kg/h | TCS 5 | TCS 2.5 | MTS 4 | TCS 28 | PTS 25 | TCS 2.5 | TCS 2.5 | 0 | MTS 56 | TCS 5 | MTS 4 |

TABLE 2-continued

Feed materials and amounts used

| | | According to the invention | | | | | | | Comparison | | | |
|---|---|---|---|---|---|---|---|---|---|---|---|---|
| | | Example | | | | | | | | | | |
| | | 1 | 2 | 3 | 4 | 5 | 6 | 7 | 8 | 9 | 10 | 11 |
| 3rd silicon component[$] | kg/h | 0 | DCS 1.5 | 0 | 0 | 0 | DCS 1.5 | DCS 1.5 | 0 | 0 | | 0 |
| Inlet temperature(*) | °C. | 90 | 90 | 90 | 90 | 90 | 90 | 90 | 90 | 90 | 90 | 90 |
| $V_{burner}$[+] | m/s | 25.8 | 31.4 | 30.7 | 31.3 | 13.4 | 33.4 | 31.0 | 28.4 | 47.9 | 25.7 | 31.8 |
| Secondary air | Nm³/h | 24 | 25 | 25 | 25 | 95 | 25 | 25 | 25 | 25 | 0 | 390 |
| Secondary air/ primary air | | 0.34 | 0.26 | 0.26 | 0.25 | 2.38 | 0.26 | 0.26 | 0.29 | 0.15 | — | 4.11 |

(*)For mixture of $H_2$, primary air, $SiCl_4$, $2^{nd}$ and optionally $3^{rd}$ silicon component
[$]MTCS = methyl trichlorosilane; TCS = trichlorosilane; DCS = dichlorodisilane, MTS = methyl trichlorosilane; PTS = n-propyl trichlorosilane
[+]= discharge velocity from burner

TABLE 3

Reaction enthalpy, heat capacity and adiabatic flame temperature

| | | According to the invention | | | | | | | Comparison | | | |
|---|---|---|---|---|---|---|---|---|---|---|---|---|
| | | Example | | | | | | | | | | |
| | | 1 | 2 | 3 | 4 | 5 | 6 | 7 | 8 | 9 | 10 | 11 |
| Sum of reaction enthalpies from partial reactions | KW | −124.3 | −144.0 | −137.8 | −140.6 | −148.0 | −156.0 | −132.0 | −128.8 | −207 | −124.4 | −138.1 |
| Heat capacity of products | KJ/s · K | 0.07 | 0.08 | 0.08 | 0.08 | 0.08 | 0.08 | 0.08 | 0.08 | 0.12 | 0.07 | 0.24 |
| Adiabatic flame temperature | °C. | 1849 | 1851 | 1823 | 1821 | 1860 | 1967 | 1731 | 1807 | 1854 | 1848 | 660 |

TABLE 4

Analytical data for silicon dioxide powders

| | | According to the invention | | | | | | | Comparison | | | | | |
|---|---|---|---|---|---|---|---|---|---|---|---|---|---|---|
| | | Example | | | | | | | | | | | | |
| | | 1 | 2 | 3 | 4 | 5 | 6 | 7 | 8 | 9 | 10 | 11 | 12[$] | 13[§] |
| BET surface area | m²/g | 90 | 88 | 92 | 89 | 91 | 58 | 151 | 90 | 92 | 89 | >450 | 87 | 91 |
| Average aggregate surface area | nm² | 16315 | 14634 | 12568 | 19851 | 12114 | n.d. | n.d. | 24568 | 23546 | 32157 | n.d. | 21165 | 29771 |
| Average ECD | nm | 114 | 109 | 104 | 121 | 102 | n.d. | n.d. | 151 | 145 | 165 | n.d. | 135 | 161 |
| Average aggregate circumference | nm | 1227 | 1159 | 1125 | 1289 | 1107 | n.d. | n.d. | 1501 | 1498 | 1916 | n.d. | 1458 | 1711 |
| Average max. aggregate diameter | nm | 218 | 208 | 201 | 248 | n.d. | n.d. | n.d. | 276 | 271 | 325 | n.d. | 255 | 296 |
| Average min. aggregate diameter | nm | 133 | 118 | 108 | 150 | n.d. | n.d. | n.d. | 172 | 169 | 211 | n.d. | 160 | 185 |
| Average primary particle diameter | nm | 14.6 | 13.9 | 13.6 | 14.6 | n.d. | n.d. | n.d. | 15.7 | 15.3 | 19.8 | n.d. | 15.6 | 19.0 |
| C content | ppm | 5 | 0 | 15 | 2 | n.d. | n.d. | n.d. | 1 | 33 | n.d. | n.d. | n.d. | n.d. |
| Cl content | ppm | 15 | 30 | 27 | 56 | n.d. | n.d. | n.d. | 75 | 42 | n.d. | n.d. | n.d. | n.d. |
| Wet-in time | sec | 7 | 8 | 6 | 11 | 8 | n.d. | n.d. | 88 | 165 | 201 | n.d. | 28 | 195 |

[$]Cab-O-Sil ® L90, Cabot;
[§]Aerosil ® 90, Degussa

The physical-chemical parameters for the dispersions are reproduced in Table 5.

TABLE 5

Physical-chemical data for the dispersions

| Ex. | Concentration [wt. %] | pH | Viscosity* ($10\ s^{-1}$) [mPas] |
|---|---|---|---|
| 14 | 15 | 3.7 | 8.8 |
| 15 | 15 | 10.4 | 6.9 |
| 16 | 50 | 10.3 | 245 |

*Viscometer: Physika

The invention claimed is:

1. A pyrogenically produced silicon dioxide powder in the form of aggregates of primary particles, characterized in that the powder has a BET surface area of 90±15 m$^2$/g; and the aggregates display
an average surface area of 10000 to 20000 nm$^2$,
an average equivalent circle diameter (ECD) of 90 to 130 nm and
an average circumference of 1000 to 1400 nm.

2. The pyrogenically produced silicon dioxide powder according to claim 1, characterized in that the aggregates display
an average surface area of 12000 to 18000 nm$^2$,
an average equivalent circle diameter of 100 to 125 nm and
an average circumference of 1100 to 1300 nm.

3. The pyrogenically produced silicon dioxide powder according to claim 1, characterized in that the maximum aggregate diameter is between 200 and 250 nm and the minimum aggregate diameter is between 100 and 155 nm.

4. The pyrogenically produced silicon dioxide powder according claim 1, characterized in that the chloride content is less than 250 ppm.

5. The pyrogenically produced silicon dioxide powder according to claim 1, characterised in that the carbon content is less than 100 ppm.

6. A process for the production of the silicon dioxide powder of claim 1, characterized in that
a mixture of silicon compounds is evaporated, separately or together, the vapours are transferred by means of a carrier gas to a mixing chamber, with
SiCl$_4$ as the first component in a proportion of 60 to 95 wt. %, relative to the mixture, and
a second component chosen from the group comprising H$_3$SiCl, H$_2$SiCl$_2$, HSiCl$_3$, CH$_3$SiCl$_3$, (CH$_3$)$_2$SiCl$_2$, (CH$_3$)$_3$SiCl, (n-C$_3$H$_7$)SiCl$_3$, in a proportion of 5 to 40 wt. %, relative to the mixture,
and a combustion gas and primary air, which can optionally be enriched with oxygen and/or be preheated, are transferred separately to the mixing chamber,
the mixture comprising the vapour of silicon chlorides, combustion gas and primary air is ignited in a burner and the flame burns into a reaction chamber,
secondary air, which surrounds the flame, is introduced into the reaction chamber, the ratio of secondary air to primary air being in a range from 0.1 to 3,
the solid is then separated from gaseous substances and the solid is then steam-treated,
wherein
the total amount of oxygen is at least sufficient for the complete combustion of the combustion gas and the silicon compounds and
the amount of feed materials consisting of silicon compounds, combustion gas, primary air and secondary air is chosen such that an adiabatic flame temperature $T_{ad}$ of 1800 to 1880° C. is obtained, where $T_{ad}$=the temperature of the feed materials+the sum of the reaction enthalpies of the partial reactions/heat capacity of the substances leaving the reaction chamber, comprising silicon dioxide, water, hydrogen chloride, carbon dioxide, oxygen, nitrogen, and optionally the carrier gas if it is not air or nitrogen, taking the specific heat capacity of these substances at 1000° C. as a basis.

7. The process according to claim 6, characterized in that the temperature of the feed materials is 90° C.±40° C.

8. The process according to claim 6, characterized in that the discharge velocity of the reaction mixture from the mixing chamber to the reaction space is 10 to 80 m/s.

9. A method of using a pyrogenically produced silicon dioxide powder, the method comprising mixing the powder of claim 1 with a member selected from the group consisting of rubber, silicone rubber, plastics, paints and coatings.

10. An aqueous dispersion containing the pyrogenically produced silicon dioxide powder of claim 1.

11. The aqueous dispersion according to claim 10, characterized in that the content of silicon dioxide is 5 to 60 wt. %.

12. The aqueous dispersion according to claim 10, characterized in that the pH of the dispersion is between 3 and 12.

13. The aqueous dispersion according to claim 10, characterized in that the average aggregate diameter in the dispersion is less than 200 nm.

14. The aqueous dispersion according to claim 10, characterized in that the dispersion contains additives.

15. A method of using an aqueous dispersion, the method comprising polishing surfaces with the dispersion of claim 10.

16. The process according to claim 6, characterized in that the ratio of secondary air to primary air is in a range from 0.25 to 2.

17. A method of using a pyrogenically produced silicon dioxide powder, the method comprising supporting a catalyst on the powder of claim 1.

* * * * *